(12) United States Patent
Yoo et al.

(10) Patent No.: US 12,363,371 B2
(45) Date of Patent: Jul. 15, 2025

(54) APPARATUS AND METHOD FOR PERFORMING AN ADAPTIVE SYNC OPERATION

(71) Applicant: LG ELECTRONICS INC., Seoul (KR)

(72) Inventors: Seunghyun Yoo, Seoul (KR); Dokyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 18/355,175

(22) Filed: Jul. 19, 2023

(65) Prior Publication Data

US 2025/0030910 A1    Jan. 23, 2025

(30) Foreign Application Priority Data

May 23, 2022    (KR) .................. 10-2022-0063073

(51) Int. Cl.
*H04N 21/43*    (2011.01)
(52) U.S. Cl.
CPC .............................. *H04N 21/4302* (2013.01)

(58) Field of Classification Search
CPC ................................................ H04N 21/42204
See application file for complete search history.

(56) References Cited

U.S. PATENT DOCUMENTS

2016/0086567 A1*  3/2016  Suzuki ............... H04N 21/4122
                                                            348/552
2017/0118443 A1*  4/2017  Kim ................. H04N 21/42204

* cited by examiner

*Primary Examiner* — Michael H Hong
(74) *Attorney, Agent, or Firm* — LEE, HONG, DEGERMAN, KANG & WAIMEY

(57) ABSTRACT

According to the present disclosure, a method performed by a source device is provided. The method comprises: receiving, from a sink device, a Hot Plug Detection (HPD); receiving, from the sink device, an Extended Display Identification Data (EDID) and DisplayID; receiving, from the sink device, a first DisplayPort Configuration Data (DPCD) including first 1-bit information related to whether or not Adaptive-Sync 2.x is supported; transmitting, to the sink device, a second DPCD including second 1-bit information indicating that the Adaptive-Sync operation operates based on the DID2.x Adaptive-Sync Data Block; and transmitting, to the sink device, Video stream data and Adaptive Sync Secondary Data Packet (SDP).

20 Claims, 8 Drawing Sheets

FIG. 4

| Type | DPCD Register Address | Name | Descriptor | Read/Write (AUX) |
|---|---|---|---|---|
| Capability | 00007h[6] | MSA_TIMING_PAR_IGNORED | | Read Only |
| Extended Capability | 02207h[6] | MSA_TIMING_PAR_IGNORED | | |
| | 02214h[0] | ADAPTIVE_SYNC_SDP_SUPPORTED | | |
| | 0xxxxh[X] -1bit | DisplayID2.x Adaptive-Sync Data Block Support | Indicates whether Sink supports DID2.x Adaptive-Sync Data block | |
| | 02218h[6] | VSC_EXT_SDP_FRAMEWORK_VERSION_1_SUPPORTED | | |
| Configuration | 00107h [7:6] | MSA_TIMING_PAR_IGNORE_EN | | Write /Read |
| | 0xxxxh[X] -1bit | Adaptive-Sync Data Block Support_EN | If Source supports the DP2.x Adaptive-Sync operation, Source writes this parameter. | |

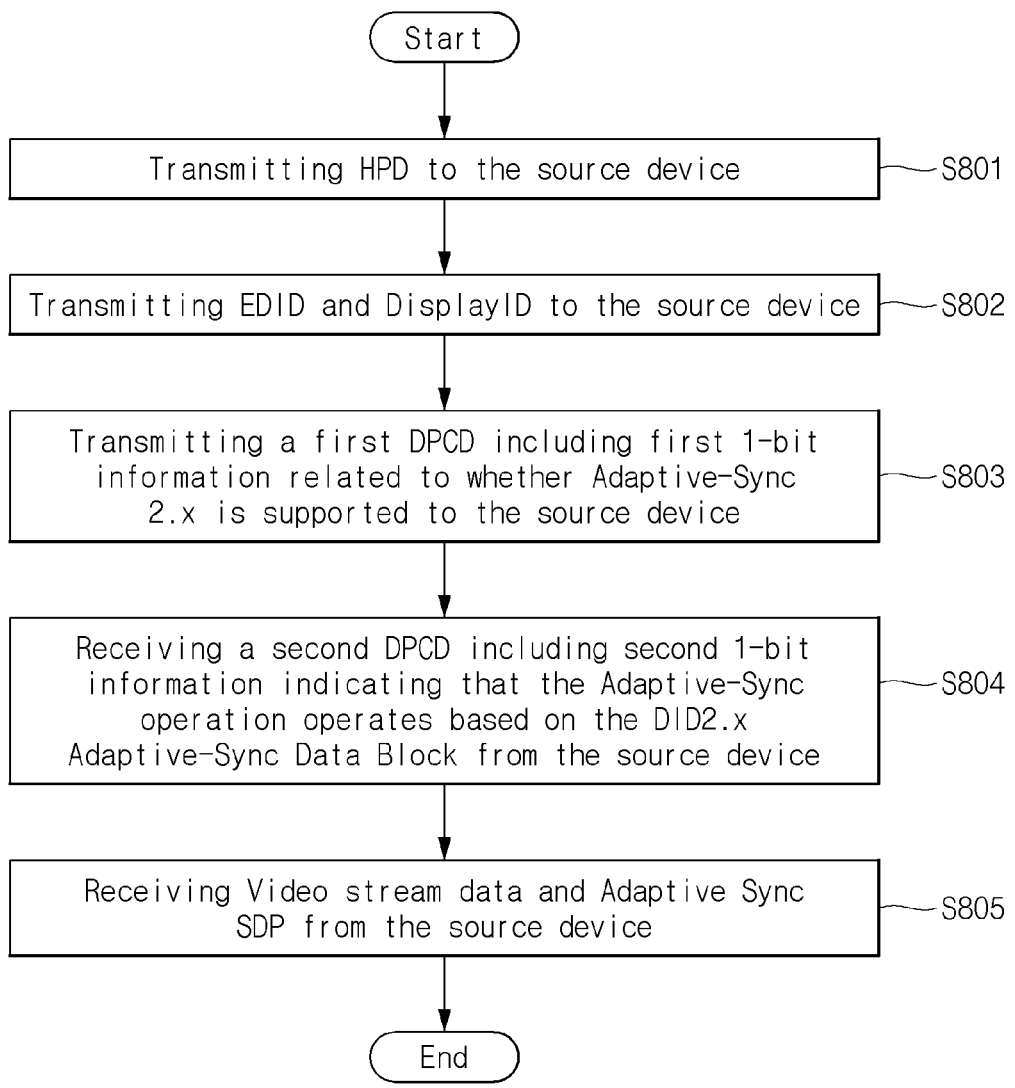

APPARATUS AND METHOD FOR PERFORMING AN ADAPTIVE SYNC OPERATION

CROSS-REFERENCE TO RELATED APPLICATIONS

Pursuant to 35 U.S.C. § 119 (a), this application claims the benefit of earlier filing date and right of priority to Korean Patent Application No. 10-2022-0063073, filed on May 23, 2022, the contents of which are all hereby incorporated by reference herein in their entireties.

BACKGROUND OF THE INVENTION

Field of the Invention

The present disclosure relates to an apparatus and method for performing an adaptive sync operation. Specifically, the present disclosure relates to an apparatus and method for effectively performing an Adaptive Sync operation in relation to DisplayPort, by sharing information on whether or not Sink simply supports Adaptive-Sync, as well as whether or not Sink supports Adaptive-Sync 2.x through 1-bit information.

Description of the Related Art

Regarding DisplayPort, there are two version for Adaptive-Sync. Sink have to mark both places for adaptive-Sync operation because of legacy Source. (1) DP1.4 Adaptive-Sync Operation—Using the EDID1.4 Range Limit block. (2) DP2.1 Adaptive-Sync Operation-Using the DisplayID 2.x Adaptive-Sync Data Block. Sinks need to distinguish source is capable of DisplayID2.x or not.

The 'second data packet (SDP)' is the only way to differentiate the Adaptive-Sync Operation version. However, it is difficult to check the SDP without special equipment. Adaptive-Sync operation of the two versions are different.

SUMMARY OF THE INVENTION

In order to solve the above-described problem, the present disclosure provides a method and apparatus for performing an adaptive sync operation.

The present disclosure provides an apparatus and method for effectively performing an Adaptive Sync operation in relation to DisplayPort, by sharing information on whether or not Sink simply supports Adaptive-Sync, as well as whether or not Sink supports Adaptive-Sync 2.x through 1-bit information.

The technical objects of the present disclosure are not limited to the aforementioned technical objects, and other technical objects, which are not mentioned above, will be apparently appreciated by a person having ordinary skill in the art from the following description.

According to the present disclosure, a method performed by a source device is provided. The method comprises: receiving, from a sink device, a Hot Plug Detection (HPD); receiving, from the sink device, an Extended Display Identification Data (EDID) and DisplayID; receiving, from the sink device, a first DisplayPort Configuration Data (DPCD) including first 1-bit information related to whether or not Adaptive-Sync 2.x is supported; transmitting, to the sink device, a second DPCD including second 1-bit information indicating that the Adaptive-Sync operation operates based on the DID2.x Adaptive-Sync Data Block; and transmitting, to the sink device, Video stream data and Adaptive Sync Secondary Data Packet (SDP).

According to the present disclosure, a method performed by a sink device is provided. The method comprises: transmitting, to the source device, a Hot Plug Detection (HPD); transmitting, to the source device, an Extended Display Identification Data (EDID) and DisplayID; transmitting, to the source device, a first DisplayPort Configuration Data (DPCD) first 1-bit information related to whether Adaptive-Sync 2.x is supported; receiving, from the source device, a second DPCD including second 1-bit information indicating that the Adaptive-Sync operation operates based on the DID2.x Adaptive-Sync Data Block; and receiving, from the source device, Video stream data and Adaptive Sync Secondary Data Packet (SDP).

According to the present disclosure, a source device is provided. The source device comprises: at least one transceiver; at least one processor; and at least one memory operably connected to the at least one processor, wherein the at least one memory is configured to store instructions that allow the at least one processor to perform operations based on being executed by the at least one processor, wherein the operations comprise: receiving, from the sink device, an Extended Display Identification Data (EDID) and DisplayID; receiving, from the sink device, a first DisplayPort Configuration Data (DPCD) including first 1-bit information related to whether or not Adaptive-Sync 2.x is supported; transmitting, to the sink device, a second DPCD including second 1-bit information indicating that the Adaptive-Sync operation operates based on the DID2.x Adaptive-Sync Data Block; and transmitting, to the sink device, Video stream data and Adaptive Sync Secondary Data Packet (SDP).

In order to solve the above-described problem, the present disclosure can provide a method and apparatus for performing an adaptive sync operation.

The present disclosure can provide an apparatus and method for effectively performing an Adaptive Sync operation in relation to DisplayPort, by sharing information on whether or not Sink simply supports Adaptive-Sync, as well as whether or not Sink supports Adaptive-Sync 2.x through 1-bit information.

BRIEF DESCRIPTION OF THE DRAWINGS

The drawings attached below are intended to aid understanding of the present disclosure, and may provide embodiments of the present disclosure together with a detailed description. However, the technical features of the present disclosure are not limited to specific drawings, and features disclosed in each drawing may be combined with each other to constitute a new embodiment. Reference numerals in each drawing may mean structural elements.

FIG. 4 illustrates an example of a DPCD parameter according to an embodiment of the present disclosure.

FIG. 8 illustrates an example of an operation process of a sink device according to various embodiments of the present disclosure.

DETAILED DESCRIPTION OF THE EMBODIMENTS

In various embodiments of the present disclosure, "A or B" may mean "only A", "only B" or "both A and B." In other words, in various embodiments of the present disclosure, "A or B" may be interpreted as "A and/or B". For example, in various embodiments of the present disclosure, "A, B, or C" may mean "only A", "only B", "only C", or "any combination of A, B, C".

A slash (/) or comma used in various embodiments of the present disclosure may mean "and/or". For example, "A/B" may mean "A and/or B". Accordingly, "A/B" may mean "only A", "only B", or "both A and B". For example, "A, B, C" may mean "A, B, or C".

In various embodiments of the present disclosure, "at least one of A and B" may mean "only A", "only B", or "both A and B". In addition, in various embodiments of the present disclosure, the expression "at least one of A or B" or "at least one of A and/or B" may be interpreted as "at least one of A and B".

In addition, in various embodiments of the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

Figure 1:
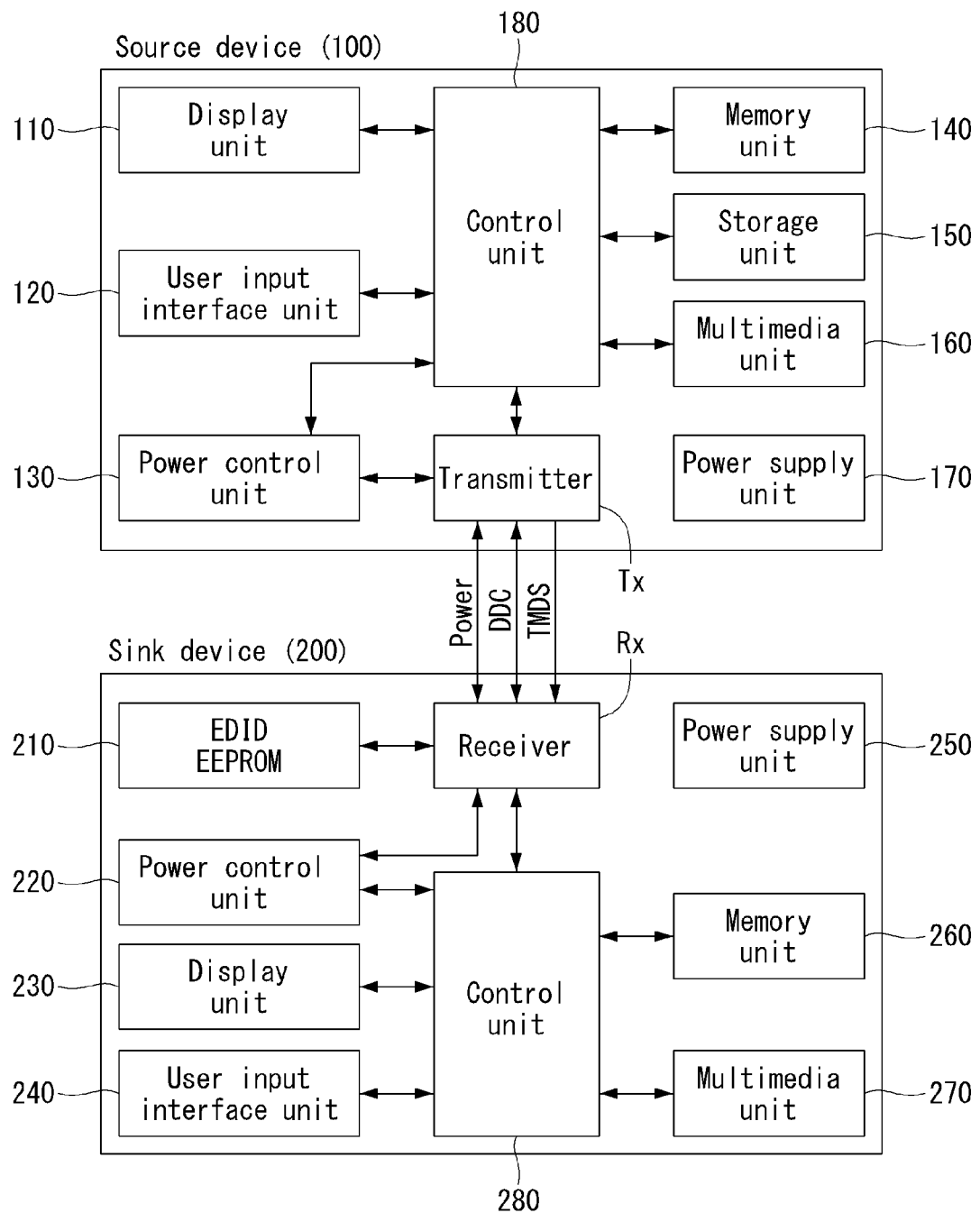
FIG. 1 is a block diagram showing an audio/video (AV) system according to an embodiment of the present invention.

FIG. 1 is a block diagram showing an audio/video (AV) system according to an embodiment of the present invention. Hereinafter, devices that transmit and receive video/audio/control data using High-Definition Multimedia Interface (HDMI) or DisplayPort are collectively called an AV system.

Referring to FIG. 1, the AV system may include a source device 100 and a sink device 200. In particular, in an AV system, a device that transmits video/audio data through the HDMI or DisplayPort may correspond to the source device 100, and a device that receives video/audio data through the HDMI or DisplayPort may correspond to the sink device 200. In this case, a cable and connectors for HDMI or DisplayPort may be provided as a physical device that supports the transmission and reception of data by connecting the two devices.

The cables for HDMI or DisplayPort and the connectors may perform the pairing of four channels that provides a Transition Minimized Differential Signaling (TMDS) data channel and a TMDS clock channel. The TMDS data channels may be used to forward video data, audio data and auxiliary data.

Additionally, the AV system provides a Video Electronics Standards Association (VESA) Display Data Channel (DDD). The DDC is used for the configuration of a source device and a sink device and the exchange of status information between them. A CEC protocol can provide a high-level control function among various audio-visual products in a user environment and may be used optionally. Also, an optional HDMI Ethernet and Audio Return Channel (HEAC) may provide Ethernet-compatible data networking among an Audio Return Channel (ARC) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in a receiver. In a source device, the data of 8 bits per TMDS data channel may be transformed into a sequence of 10 bits of which transition is minimized, which is DC balanced, and transmitted in a serial manner at the rate of 10 bits per TMDS clock period.

In order to transmit audio data and supplementary data through the TMDS channel, the HDMI or DisplayPort may use a packet structure. In order to attain high reliability for audio data and control data, data may be transmitted in word of 10 bits which is generated by using a BCH error correction code and an error reduction coding.

The source device can figure out configuration information and available functions of the sink device by reading out Enhanced Extended Display Identification Data (E-EDID) of the sink device in the Display Data Channel (DDC). In what follows, the E-EDID may be called EDID information.

A utility line can be used for an optional extension function such as HEAC.

The source device 100 may receive Extended Display Identification Data (EDID) information from the sink device 200 through the DDC channel. The source device 100 may recognize the configuration information and support function of the sink device 200 by parsing the received EDID information. The EDID information may include at least one block including a variety of pieces of information about the sink device 200.

In particular, the EDID information according to an embodiment of the present invention may include information about the function and power supply ability of the sink device 200 in the transmission and reception of power. The source device 100 may recognize the power transmission/reception ability of the sink device 200 through such EDID information, and thus may transmit power to the sink device 200 or receive power from the sink device 200.

The source device 100 includes at least one of a display unit 110, a user input interface unit 120, a control unit 180, a transmitter Tx, a memory unit 140, a storage unit 150, a multimedia unit 160, a power control unit 130, and a power supply unit 170. The source device 100 may include a transmitter Tx and a receiver Rs, or a transceiver.

The sink device 200 includes at least one of EDID EEPROM 210, a power control unit 220, a display unit 230, a user input interface unit 240, a receiver Rx, a control unit 280, a power supply unit 250, a memory unit 260, and a multimedia unit 270. A unit that performs the same operation is not redundantly described. The sink device 200 may include a transmitter Tx and a receiver Rs, or a transceiver.

The source device 100 is indicative of a physical device that transmits or streams content, stored in the storage unit 150, to the sink device 200. The source device 100 may transmit a request message to the sink device 200 or may receive and process a request message received from the sink device 200. The source device 100 may provide a User Interface (UI) through which a response message transmitted by the sink device 200 in response to a received request message is processed and delivered to a user. If the source device 100 includes the display unit 110, it may provide the UI in the form of a display. Furthermore, the source device 100 may require the supply of power from the sink device 200.

The sink device 200 may receive content from the source device 100, may transmit a request message to the source device 100 or process a message received from the source device 100, and may transmit a response message. The sink device 200 may provide a UI through which a response message received from the source device 100 is processed and delivered to a user. If the sink device 200 includes the display unit 230, it may provide the UI in the form of a display. Furthermore, the sink device 200 may supply the source device 100 with power requested by the source device 100.

The user input interface unit 120, 240 may receive a user's action or input. In an embodiment, the user input interface 120, 240 may correspond to a remote controller, a voice reception/recognition device or a touch input sensing/reception device.

The control unit 180, 280 may control an overall operation of each device. In particular, the control unit 180, 280 may perform communication between the units of each device and control the operation of each unit.

The memory unit 140, 260 is indicative of a volatile physical device in which various types of data are temporarily stored.

The storage unit 150 is indicative of a non-volatile physical device capable of storing various types of data.

The EDID EEPROM 210 is indicative of EEPROM in which EDID information is stored.

All of the memory unit 140, 260, the storage unit 150, and the EDID EEPROM 210 function to store data, and they may be collectively called a memory unit.

The display unit 110, 230 may display data or content received through the HDMI, data and a UI stored in the memory unit, etc. under the control of the control unit 180, 280.

The multimedia unit 160, 270 may play back various types of multimedia. The multimedia unit 160, 270 may be implemented independently of the control unit 180, 280 or may be implemented as a single physical element along with the control unit 180, 280.

The power supply unit 170, 250 may supply power for the operations of the source device 100, the sink device 200, and the units of the source device 100 and the sink device 200.

The transmitter Tx is a unit included in the source device 100 and configured to transmit and receive data through the HDMI or DisplayPort. The transmitter Tx performs the transmission and reception of data including messages, such as commands, requests and responses between the devices, in addition to audio/video data.

The receiver Rx is a unit included in the sink device 200 and configured to transmit and receive data through the HDMI or DisplayPort. The receiver Rx performs the transmission and reception of data including messages, such as commands, requests or responses between the devices, in addition to audio/video data.

The power control unit 130, 220 may manage and control the transmission and reception of power between the devices through the transmitter and the receiver.

Units of the aforementioned units other than the transmitter Rx, the receiver Tx, and the control unit 180, 280 may be optionally included in the source device 100 or the sink device 200 according to an embodiment, and may not correspond to essential element units.

Configuration of Various Embodiments of the Present Disclosure

Figure 2:
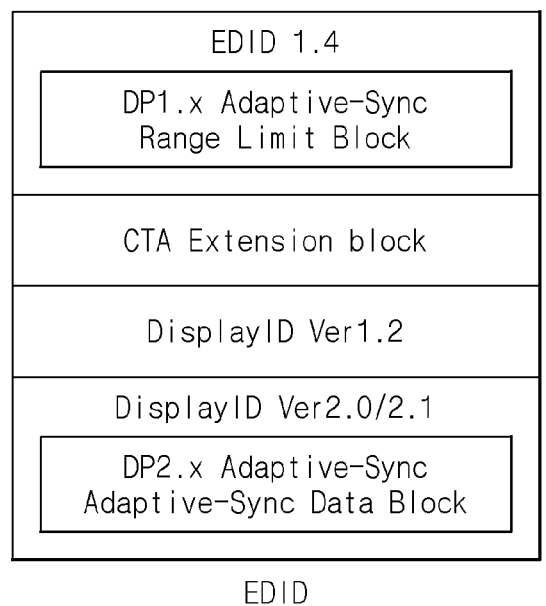
FIG. 2 illustrates the structure of an EDID according to an embodiment of the present disclosure.

FIG. 2 illustrates the structure of an EDID according to an embodiment of the present disclosure.

Referring to FIG. 2, Extended Display Identification Data (EDID) includes EDID 1.4, CTA Extension block, DisplayID Ver1.2, DisplayID Ver2.0/2.1.

EDID 1.4 includes DP1.x Adaptive-Sync Range Limit Block.

DisplayID Ver2.0/2.1 includes DP2.x Adaptive-Sync Adaptive-Sync Data Block.

Referring to FIG. 2, the EDID includes 4 blocks. Three blocks (EDID 1.4, CTA Extension block, DisplayID Ver1.2) have been used from the past. One block (DisplayID Ver2.0/2.1) was recently added.

There are two version for Adaptive-Sync.

Sink have to mark both places for adaptive-Sync operation because of legacy Source.

(1) DP1.4 Adaptive-Sync Operation-Using the EDID1.4 Range Limit block
(2) DP2.1 Adaptive-Sync Operation-Using the DisplayID 2.x Adaptive-Sync Data Block Sinks need to distinguish source is capable of DisplayID2.1 or not.

Figure 3:
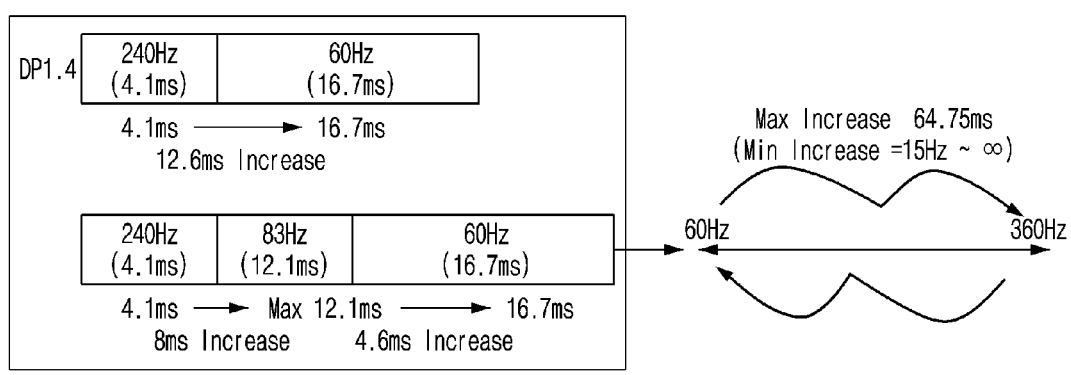
FIG. 3 illustrates Adaptive-Sync operation in DP1.4 and DP2.x.

FIG. 3 illustrates Adaptive-Sync operation in DP1.4 and DP2.x.

A technical problem is as following: The 'second data packet (SDP)' is the only way to differentiate the Adaptive-Sync Operation version. However, it is difficult to check the SDP without special equipment.

Adaptive-Sync operation of the two versions are different. (e.g. SFDIT/SFDDT)

When Source turns on Adaptive-Sync operation, Sink waits. For example, the frequency varies, such as 60 Hz, 48 Hz, 60 Hz, and 48 Hz. As the frequency goes down, it takes a lot of time for the Source to process an image. For example, if you move the mouse quickly in a frame, the screen moves instantaneously, and each object displayed on the background of the moving screen must be rendered. Because it takes a long time for the source to process and transmit the image, the sink stops because there is no data to receive in the image section that takes a long time to process for the same frequency. Then, when the source suddenly transmits data, transmission is performed in the section where the sink is stopped. Therefore, the frequency goes down due to the throughput of the Source.

Adaptive-Sync operation is performed by Source. In order for the source to perform Adaptive-Sync operation, the sink must also support Adaptive-Sync operation. Adaptive-Sync operation is characterized in that the length of the section received by the sink is variable.

Referring to FIG. 3, the length of a section in which transmission is performed from a source to a sink is shown for each frequency.

In the case of DP1.4, transmission is performed for 4.1 ms at 240 Hz and transmission is performed for 16.7 ms at 60 Hz.

In the case of DP2.x supporting SFDIT/SFDDT, transmission is performed for 4.1 ms at 240 Hz, transmission is performed for 12.1 ms at 83 Hz, and transmission is performed for 16.7 ms at 60 Hz.

Sink does not know whether Sink supports DP1.4 or DP2.1. Currently, data is transmitted from the source to the sink by displaying two types, DP1.4 and DP2.x. DP1.4 and DP2.x display different contents.

FIG. 4 illustrates an example of a DPCD parameter according to an embodiment of the present disclosure.

Specifically, FIG. 4 shows DPCD parameters newly proposed according to an embodiment of the present disclosure.

Added DPCD parameter for exposing Adaptive-Sync data blocks in DisplayID 2.x.

Before the Adaptive-Sync operation, Sink can prepare the Successive Frame Duration operation.

If Successive Frame Duration is supported, Sink can ready to the Flicker Luminance compensation technology (It compensates for Luminance when there is a sudden Luminance change).

Referring to FIG. 4, Suggested parameters are as follows.
(1) Type: Capability
(1-1) DPCD Register Address: 00007h [6], Name: MSA_TIMING_PAR_IGNORED, Read/Write (AUX): Read Only
(2) Type: Extended Capability
(2-1) DPCD Register Address: 02207h [6]. Name: MSA_TIMING_PAR_IGNORED, Read/Write (AUX): Read Only
(2-2) DPCD Register Address: 02214h [0], Name: ADAPTIVE_SYNC_SDP_SUPPORTED, Read/Write (AUX): Read Only
(2-3) DPCD Register Address: 0xxxxh [X]–1 bit, Name: DisplayID2.x Adaptive-Sync Data Block Support, Descriptor: Indicates whether Sink supports DID2.x Adaptive-Sync Data block, Read/Write (AUX): Read Only
(2-4) DPCD Register Address: 02218h [6], Name: VSC_EXT_SDP_FRAMEWORK_VERSION_1_SUPPORTED, Read/Write (AUX): Read Only
(3) Type: Configuration
(3-1) DPCD Register Address: 00107h [7:6], Name: MSA_TIMING_PAR_IGNORE_EN, Read/Write (AUX): Write/Read
(3-2) DPCD Register Address: 0xxxxh [X]–1 bit, Name: Adaptive-Sync Data Block Support_EN, Descriptor: If Source supports the DP2.x Adaptive-Sync operation, Source writes this parameter., Read/Write (AUX): Write/Read The benefits of 0xxxxh [X] (1-bit parameter) newly proposed in Extended Capability and 0xxxxh [X] (1-bit parameter) newly proposed in Configuration are as follows: Sinks and Sources could know the supporting Adaptive-Sync data block of DisplayID2.x or not via DPCD in advance.

Figure 5:
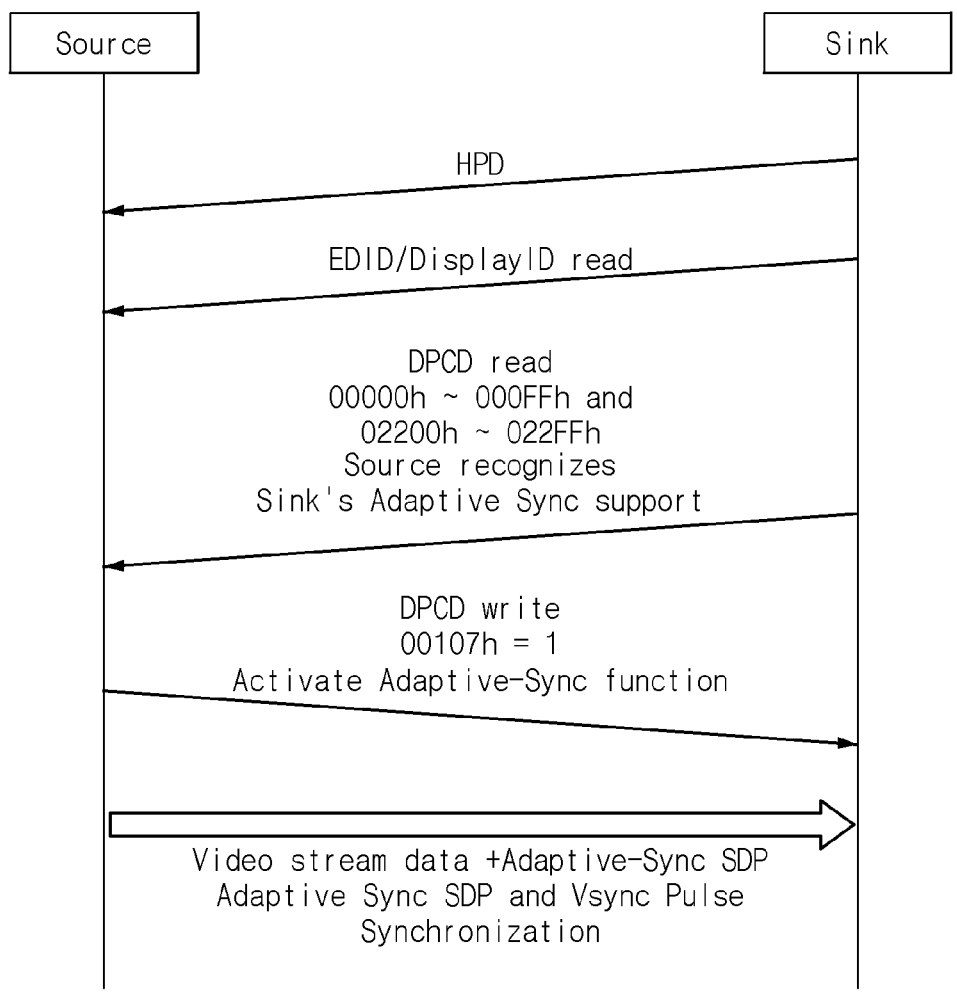
FIG. 5 illustrates a conventional signal flow related to an Adaptive-Sync operation between a source and a sink.

FIG. 5 illustrates a conventional signal flow related to an Adaptive-Sync operation between a source and a sink.

Referring to FIG. 5, Source receives HPD from Sink.
Source receives and reads EDID/DIsplayID from Sink.
Source receives and reads DPCD with 00000h to 000FFh and 02200h to 022FFh from Sink. Source recognizes Sink's Adaptive Sync support.
Source writes and transmits DPCD with 00107h=1 to Sink. DPCD with 00107h=1 activates Adaptive-Sync function.
Source transmits Video stream data and Adaptive-Sync SDP to Sink. Adaptive Sync SDP and Vsync Pulse Synchronization is performed.

Figure 6:
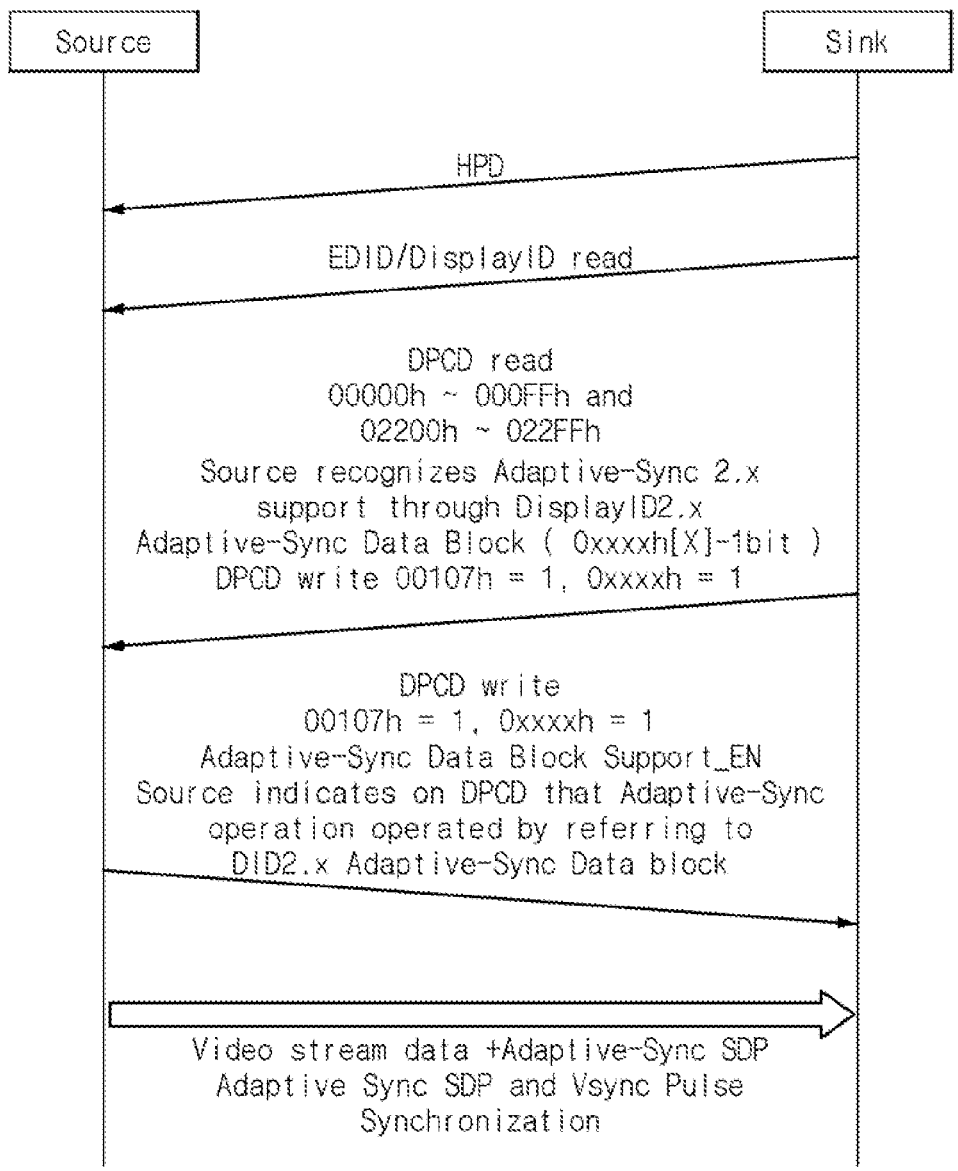
FIG. 6 illustrates a signal flow related to an Adaptive-Sync operation between a source and a sink according to an embodiment of the present disclosure.

FIG. 6 illustrates a signal flow related to an Adaptive-Sync operation between a source and a sink according to an embodiment of the present disclosure.

Referring to FIG. 6, Source receives HPD from Sink.
Source receives and reads EDID/DIsplayID from Sink.
Source receives and reads DPCD with 00000h to 000FFh and 02200h to 022FFh from Sink. Source recognizes Adaptive-Sync 2.x support through DisplayID2.x Adaptive-Sync Data Block (0xxxxh [X] which is 1 bit information).
Source writes and transmits DPCD with 00107h=1, and 0xxxxh=1 (0xxxxh is 1 bit information) to Sink. Source indicates on DPCD that Adaptive-Sync operation is performed by referring to DisplayID2.x (DID2.x) Adaptive-Sync Data block.
Source transmits Video stream data and Adaptive-Sync SDP to Sink. Adaptive Sync SDP and Vsync Pulse Synchronization is performed.

[Description Related to Source Device Claim]

Hereinafter, the above-described embodiments will be described in detail with reference to FIG. 7 in terms of operation of a source device. The methods described below are only classified for convenience of explanation, and it goes without saying that some configurations of one method may be substituted with some configurations of another method or may be combined and applied to each other, unless mutually excluded.

Figure 7:
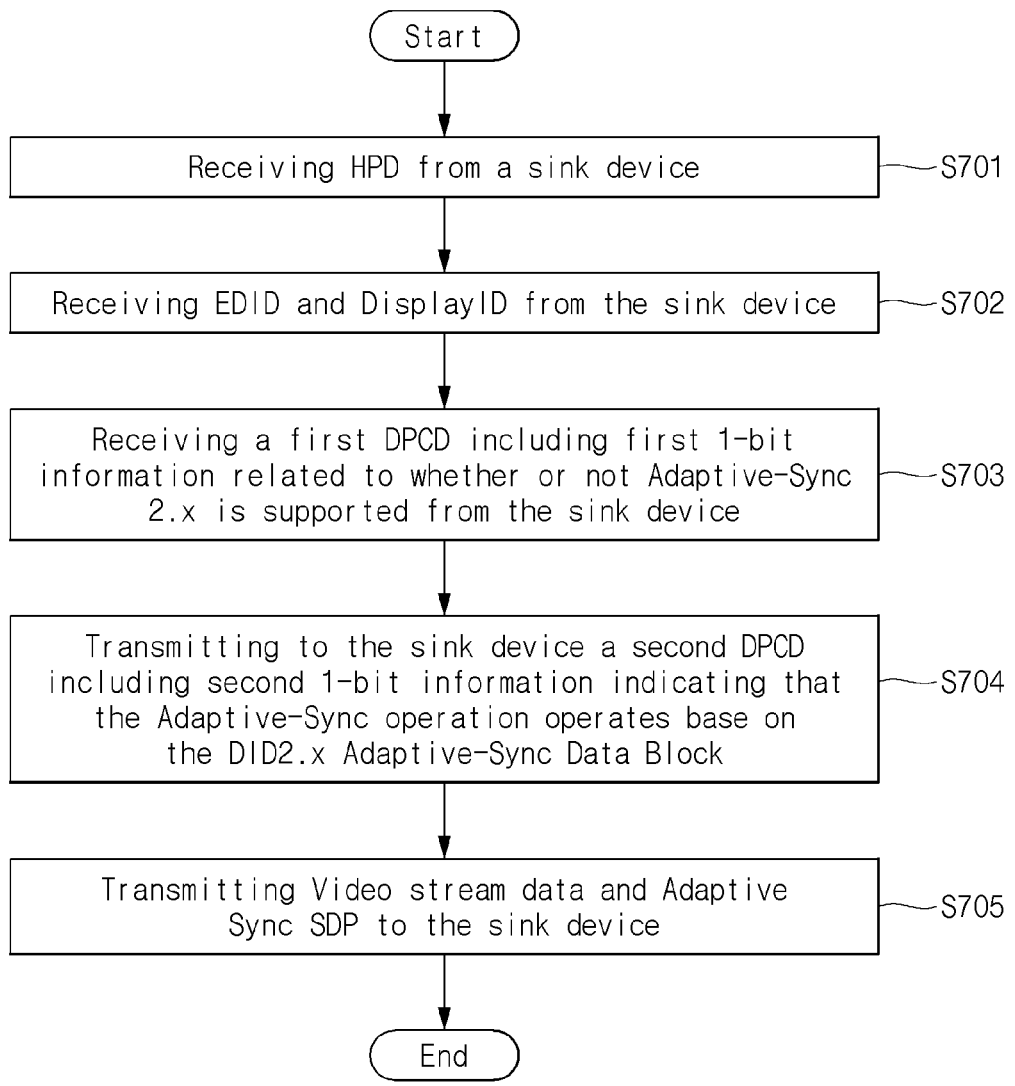
FIG. 7 illustrates an example of an operation process of a source device according to various embodiments of the present disclosure.

FIG. 7 illustrates an example of an operation process of a source device according to various embodiments of the present disclosure.

In step S701, the source device receives, from a sink device, a Hot Plug Detection (HPD).

In step S702, the source device receives, from the sink device, an Extended Display Identification Data (EDID) and DisplayID.

In step S703, the source device receives, from the sink device, a first DisplayPort Configuration Data (DPCD) including first 1-bit information related to whether or not Adaptive-Sync 2.x is supported.

In step S704, the source device transmits, to the sink device, a second DPCD including second 1-bit information indicating that the Adaptive-Sync operation operates based on the DID2.x Adaptive-Sync Data Block.

In step S705, the source device transmits, to the sink device, Video stream data and Adaptive Sync Secondary Data Packet (SDP).

According to the various embodiments of the present disclosure, the first 1-bit information indicates whether the sink device supports the DID2.x Adaptive-Sync Data Block.

According to the various embodiments of the present disclosure, the second 1-bit-information is included in the second DPCD in case of that the source device supports DP2.x Adaptive Sync operation.

According to the various embodiments of the present disclosure, the EDID includes a DP1.x Adaptive Sync Range Limit Block and a DP2.x Adaptive Sync Data Block.

According to the various embodiments of the present disclosure, one Adaptive Sync method between DP1.x Adaptive Sync or DP2.x Adaptive Sync is shared between the source device and the sink device through the first DPCD and the second DPCD.

According to the various embodiments of the present disclosure, the Video stream data and the Adaptive Sync SDP are transmitted from the source device to the Sync device based on the Adaptive Sync method shared between the source device and the sink device.

According to the various embodiments of the present disclosure, a synchronization between the Adaptive Sync SDP and Vsync Pulse is performed based on the Adaptive Sync method shared between the source device and the sink device.

According to various embodiments of the present disclosure, a source device is provided. The source device includes at least one transceiver; at least one processor; and at least one memory. The at least one memory may be configured to store instructions for performing the operating method of the source device according to FIG. 7 based on being executed by the at least one processor.

According to various embodiments of the present disclosure, a control device for controlling a source device is provided. The control device includes at least one processor and at least one memory operatively connected to the at least one processor. The at least one memory may be configured to store instructions for performing the operating method of the source device according to FIG. 7 based on being executed by the at least one processor.

According to various embodiments of the present disclosure, one or more non-transitory computer readable mediums (CRMs) storing one or more instructions are provided. The one or more instructions may perform operations based on being executed by one or more processors, and the operations may include the method of operating the source device according to FIG. 7.

[Description Related to Sink Device Claims]

Hereinafter, the above-described embodiments will be described in detail with reference to FIG. 8 in terms of operation of a sink device. The methods described below are only classified for convenience of explanation, and it goes without saying that some configurations of one method may be substituted with some configurations of another method or may be combined and applied to each other, unless mutually excluded.

FIG. 8 illustrates an example of an operation process of a sink device according to various embodiments of the present disclosure.

In step 801, the sink device transmits, to the source device, a Hot Plug Detection (HPD).

In step S802, the sink device transmits, to the source device, an Extended Display Identification Data (EDID) and DisplayID.

In step S803, the sink device transmits, to the source device, a first DisplayPort Configuration Data (DPCD) first 1-bit information related to whether Adaptive-Sync 2.x is supported.

In step S804, the sink device receives, from the source device, a second DPCD including second 1-bit information indicating that the Adaptive-Sync operation operates based on the DID2.x Adaptive-Sync Data Block.

In step S805, the sink device receives, from the source device, Video stream data and Adaptive Sync Secondary Data Packet (SDP).

According to the various embodiments of the present disclosure, the first 1-bit information indicates whether the sink device supports the DID2.x Adaptive-Sync Data Block.

According to the various embodiments of the present disclosure, the second 1-bit-information is included in the second DPCD in case of that the sink device supports DP2.x Adaptive Sync operation.

According to the various embodiments of the present disclosure, the EDID includes a DP1.x Adaptive Sync Range Limit Block and a DP2.x Adaptive Sync Data Block.

According to the various embodiments of the present disclosure, one Adaptive Sync method between DP1.x Adaptive Sync or DP2.x Adaptive Sync is shared between the sink device and the sink device through the first DPCD and the second DPCD.

According to the various embodiments of the present disclosure, the Video stream data and the Adaptive Sync SDP are received from the source device based on the Adaptive Sync method shared between the source device and the sink device.

According to the various embodiments of the present disclosure, a synchronization between the Adaptive Sync SDP and Vsync Pulse is performed based on the Adaptive Sync method shared between the sink device and the sink device.

According to various embodiments of the present disclosure, a sink device is provided. The sink device includes at least one transceiver; at least one processor; and at least one memory. The at least one memory may be configured to store instructions for performing the operating method of the sink device according to FIG. 8 based on being executed by the at least one processor.

According to various embodiments of the present disclosure, a control device for controlling a sink device is provided. The control device includes at least one processor and at least one memory operatively connected to the at least one processor. The at least one memory may be configured to store instructions for performing the operating method of the sink device according to FIG. 8 based on being executed by the at least one processor.

According to various embodiments of the present disclosure, one or more non-transitory computer readable mediums (CRMs) storing one or more instructions are provided. The one or more instructions may perform operations based on being executed by one or more processors, and the operations may include the method of operating the sink device according to FIG. 8.

Claims described in the present disclosure can be combined in a various way. For instance, technical features in method claims of the present disclosure can be combined to be implemented as an apparatus, and technical features in apparatus claims can be combined to be implemented as a method. Further, technical features in method claim and apparatus claim can be combined to be implemented as an apparatus. Further, technical features in method claim and apparatus claim can be combined to be implemented as a method.

What is claimed is:

1. A method performed by a source device, the method comprising:
    receiving, from a sink device, a Hot Plug Detection (HPD);
    receiving, from the sink device, an Extended Display Identification Data (EDID) and DisplayID;
    receiving, from the sink device, a first DisplayPort Configuration Data (DPCD) including first 1-bit information related to whether or not Adaptive-Sync 2.x is supported by the sink device,
    wherein the first 1-bit information is of type Extended Capability and is only readable for the source device;
    transmitting, to the sink device, a second DPCD with second 1-bit information added to the first DPCD, the second DCP indicating that the Adaptive-Sync operation operates based on the DID2.x Adaptive-Sync Data Block by the source device,
    wherein the second 1-bit information is of type Configuration and is readable and writable for the source device; and
    transmitting, to the sink device, Video stream data and Adaptive Sync Secondary Data Packet (SDP),
    wherein, based on the Adaptive-Sync operation based on the DID2.x Adaptive-Sync Data Block supporting Successive Frame Duration Increase Tolerance (SFDIT) and Successive Frame Duration Decrease Tolerance (SFDDT), the Video stream data is transmitted for a first time period at a first frequency, and transmitted for a second time period at a second frequency, and transmitted for a third time period at a third frequency, wherein the second frequency is between the first frequency and the third frequency, and wherein, based on the Adaptive-Sync operation not based on the DID 2.x Adaptive-Sync Data Block, the Video stream data is transmitted for the first time period at the first frequency, and transmitted for the third time period at the third frequency.

2. The method of claim 1,
wherein the first 1-bit information indicates whether the sink device supports the DID2.x Adaptive-Sync Data Block.

3. The method of claim 1,
wherein the second 1-bit-information is included in the second DPCD in case of that the source device supports DP2.x Adaptive Sync operation.

4. The method of claim 1,
wherein the EDID includes a DP1.x Adaptive Sync Range Limit Block and a DP2.x Adaptive Sync Data Block.

5. The method of claim 1,
wherein one Adaptive Sync method between DP1.x Adaptive Sync or DP2.x Adaptive Sync is shared between the source device and the sink device through the first DPCD and the second DPCD.

6. The method of claim 5,
wherein the Video stream data and the Adaptive Sync SDP are transmitted from the source device to the sink device based on the Adaptive Sync method shared between the source device and the sink device.

7. The method of claim 5,
wherein a synchronization between the Adaptive Sync SDP and Vsync Pulse is performed based on the Adaptive Sync method shared between the source device and the sink device.

8. A method performed by a sink device, the method comprising:
transmitting, to a source device, a Hot Plug Detection (HPD);
transmitting, to the source device, an Extended Display Identification Data (EDID) and DisplayID;
transmitting, to the source device, a first DisplayPort Configuration Data (DPCD) first 1-bit information related to whether Adaptive-Sync 2.x is supported by the sink device,
wherein the first 1-bit information is of type Extended Capability and is only readable for the source device;
receiving, from the source device, a second DPCD with second 1-bit information added to the first DPCD, the second DCP indicating that the Adaptive-Sync operation operates based on the DID2.x Adaptive-Sync Data Block by the source device,
wherein the second 1-bit information is of type Configuration and is readable and writable for the source device; and
receiving, from the source device, Video stream data and Adaptive Sync Secondary Data Packet (SDP),
wherein, based on the Adaptive-Sync operation based on the DID2.x Adaptive-Sync Data Block supporting Successive Frame Duration Increase Tolerance (SFDIT) and Successive Frame Duration Decrease Tolerance (SFDDT), the Video stream data is received for a first time period at a first frequency, and received for a second time period at a second frequency, and received for a third time period at a third frequency,
wherein the second frequency is between the first frequency and the third frequency, and
wherein, based on the Adaptive-Sync operation not based on the DID 2.x Adaptive-Sync Data Block, the Video stream data is received for the first time period at the first frequency, and received for the third time period at the third frequency.

9. The method of claim 8,
wherein the first 1-bit information indicates whether the sink device supports the DID2.x Adaptive-Sync Data Block.

10. The method of claim 8,
wherein the second 1-bit-information is included in the second DPCD in case of that the source device supports DP2.x Adaptive Sync operation.

11. The method of claim 8,
wherein the EDID includes a DP1.x Adaptive Sync Range Limit Block and a DP2.x Adaptive Sync Data Block.

12. The method of claim 8,
wherein one Adaptive Sync method between DP1.x Adaptive Sync or DP2.x Adaptive Sync is shared between the source device and the sink device through the first DPCD and the second DPCD.

13. The method of claim 12,
wherein the Video stream data and the Adaptive Sync SDP are received from the source device based on the Adaptive Sync method shared between the source device and the sink device.

14. The method of claim 12,
wherein a synchronization between the Adaptive Sync SDP and Vsync Pulse is performed based on the Adaptive Sync method shared between the source device and the sink device.

15. A source device, the source device comprising:
at least one transceiver;
at least one processor; and
at least one memory operably connected to the at least one processor,
wherein the at least one memory is configured to store instructions that allow the at least one processor to perform operations based on being executed by the at least one processor,
wherein the operations comprise:
receiving, from a sink device, an Extended Display Identification Data (EDID) and DisplayID;
receiving, from the sink device, a first DisplayPort Configuration Data (DPCD) including first 1-bit information related to whether or not Adaptive-Sync 2.x is supported by the sink device,
wherein the first 1-bit information is of type Extended Capability and is only readable for the source device;
transmitting, to the sink device, a second DPCD with second 1-bit information added to the first DPCD, the second DCP indicating that the Adaptive-Sync operation operates based on the DID2.x Adaptive-Sync Data Block by the source device,
wherein the second 1-bit information is of type Configuration and is readable and writable for the source device; and
transmitting, to the sink device, Video stream data and Adaptive Sync Secondary Data Packet (SDP),
wherein, based on the Adaptive-Sync operation based on the DID2.x Adaptive-Sync Data Block supporting Successive Frame Duration Increase Tolerance (SFDIT) and Successive Frame Duration Decrease Tolerance (SFDDT), the Video stream data is transmitted for a first time period at a first frequency, and transmitted for a second time period at a second frequency, and transmitted for a third time period at a third frequency,
wherein the second frequency is between the first frequency and the third frequency, and wherein, based on the Adaptive-Sync operation not based on the DID 2.x Adaptive-Sync Data Block, the Video stream data is transmitted for the first time period at the first frequency, and transmitted for the third time period at the third frequency.

16. The source device of claim 15, wherein the first 1-bit information indicates whether the sink device supports the DID2.x Adaptive-Sync Data Block.

17. The source device of claim 15, wherein the second 1-bit-information is included in the second DPCD in case of that the source device supports DP2.x Adaptive Sync operation.

18. The source device of claim 15, wherein the EDID includes a DP1.x Adaptive Sync Range Limit Block and a DP2.x Adaptive Sync Data Block.

19. The source device of claim 15, wherein one Adaptive Sync method between DP1.x Adaptive Sync or DP2.x Adaptive Sync is shared between the source device and the sink device through the first DPCD and the second DPCD.

20. The source device of claim 19, wherein a synchronization between the Adaptive Sync SDP and Vsync Pulse is performed based on the Adaptive Sync method shared between the source device and the sink device.

* * * * *